United States Patent [19]

Bristow

[11] 4,423,870
[45] Jan. 3, 1984

[54] VIDEO GAME COLLISION DETECTION SYSTEM

[75] Inventor: Stephen D. Bristow, Los Altos Hills, Calif.

[73] Assignee: Atari, Inc., Sunnyvale, Calif.

[21] Appl. No.: 350,977

[22] Filed: Feb. 22, 1982

Related U.S. Application Data

[63] Continuation of Ser. No. 34,715, Apr. 30, 1979, abandoned.

[51] Int. Cl.³ .............................................. A63F 9/22
[52] U.S. Cl. ............................... 273/85 G; 273/86 R; 273/DIG. 28
[58] Field of Search .................. 273/1 GC, 1 E, 85 G, 273/86 R, 86 B, 313, DIG. 28, 310–312; 358/93, 104; 340/723–725

[56] References Cited

U.S. PATENT DOCUMENTS

| | | | |
|---|---|---|---|
| 3,659,285 | 4/1972 | Baer et al. | 273/DIG. 28 |
| 3,777,410 | 12/1973 | Robinson | 273/DIG. 28 |
| 4,006,898 | 2/1977 | Greaf et al. | 273/85 G |
| 4,034,990 | 7/1977 | Baer | 273/DIG. 28 |
| 4,053,740 | 10/1977 | Rosenthal | 273/DIG. 28 |
| 4,068,847 | 1/1978 | Lukkarila et al. | 273/DIG. 28 |
| 4,095,785 | 6/1978 | Conner | 273/DIG. 28 |
| 4,112,422 | 9/1978 | Mayer et al. | 273/86 B |
| 4,145,043 | 3/1979 | Olliges | 273/DIG. 28 |
| 4,162,792 | 7/1979 | Chang et al. | 273/85 G |
| 4,185,825 | 1/1980 | Bromley | 273/DIG. 28 |

OTHER PUBLICATIONS

*Gametronics Proceedings;* "An Approach to Microprocessor-Based Game Architecture", Jan. 1977; pp. 31–43.

*Primary Examiner*—Vance Y. Hum
*Attorney, Agent, or Firm*—Townsend and Townsend

[57] ABSTRACT

A video game includes a pre-recorded video signal depicting selected objects upon a background; e.g., a race track where the selected objects are colored racing cars, the color being used to distinguish the cars from their background. An associated video game unit with manual player controls generates a manually actuated object and collisions are indicated by sensing the time coincident signals of the selected object and the manually actuated object.

8 Claims, 2 Drawing Figures

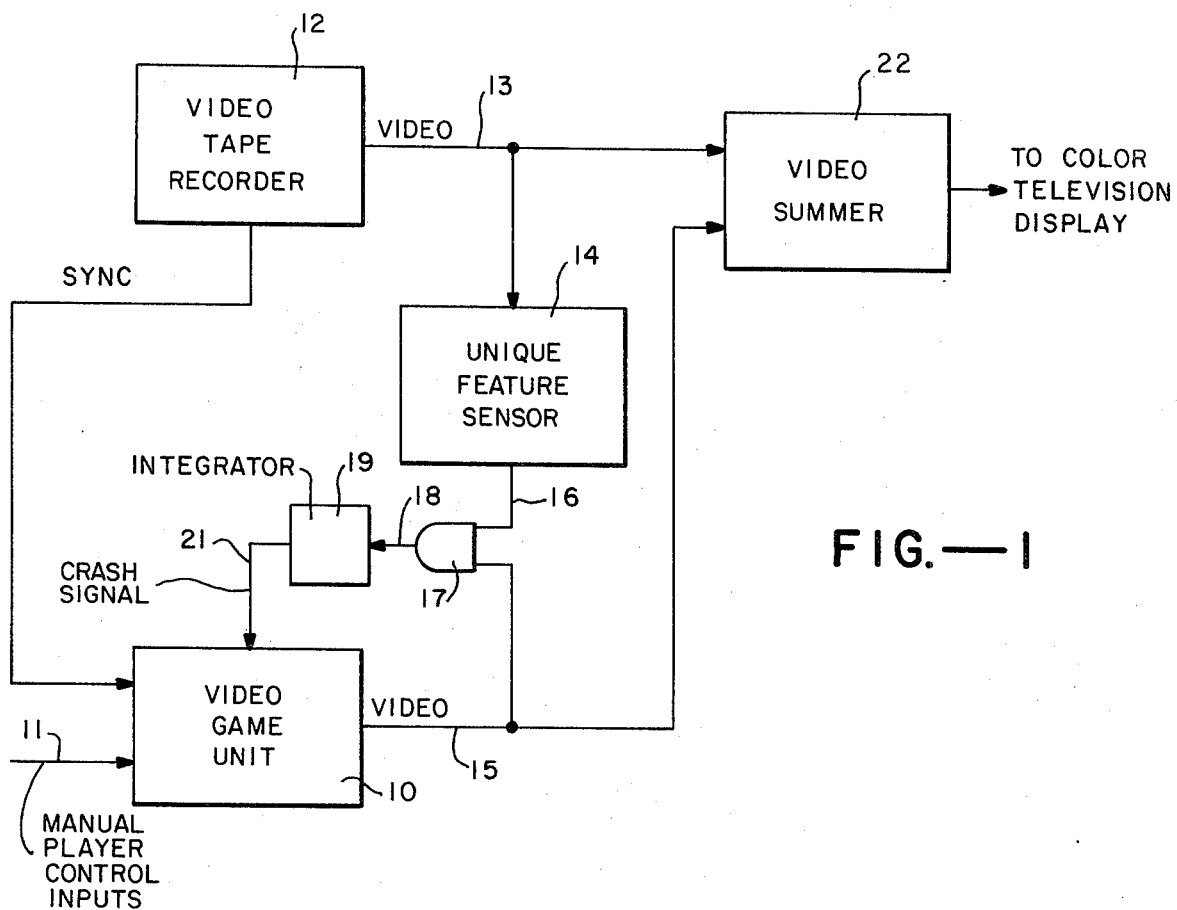
FIG.—1
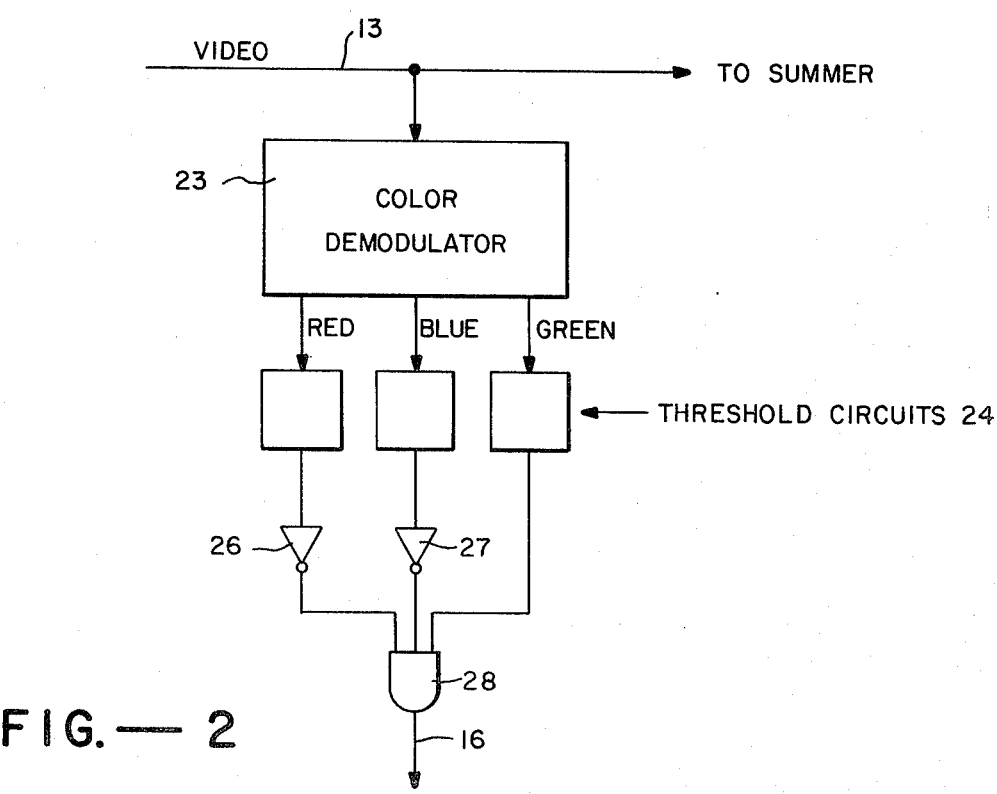
FIG.—2

VIDEO GAME COLLISION DETECTION SYSTEM

This is a continuation of application Ser. No. 34,715, filed Mar. 30, 1979 now abandoned.

BACKGROUND OF THE INVENTION

The present invention is directed to a video game with a pre-recorded video signal and more specifically the combination of such pre-recorded signal with a video game unit having manually actuated movable objects such as cars in a road racing game.

The use of pre-recorded video such as by means of a video tape recorder in order to provide background scenes is well known in television broadcasting. Very simply, the technique involves removing the existing background behind a newscaster, for example, and substituting a new background by the use of color keying.

In a video game such as a road racing game it is desired to provide a realistic image of a racetrack. This is most conveniently done by a pre-recorded video tape. However, the difficulty in the past has been in providing an indication of a crash or collision when the manually actuated car in the game crashes against an obstacle, a pre-recorded car, or goes off the edge of the video racetrack.

OBJECTS AND SUMMARY OF THE INVENTION

It is therefore a general object of the present invention to provide an improved video game utilizing a pre-recorded signal.

It is another more specific object of the invention to provide a video game as above where the pre-recorded signal provides the background which is displayed on a raster scanned cathode ray tube display.

In accordance with the above objects, there is provided a video game having a television display screen comprising a pre-recorded video signal generator having pre-recorded objects with a unique video identification feature. Video motion means having manual player controls are responsive to actuation of such controls for moving an effective object on the video display screen on which the pre-recorded objects are concurrently displayed. Means are provided for sensing the unique video identification feature of the pre-recorded objects and responsive to the time coincidence on the display screen of said manually actuated effective object for providing an indication of at least the partial coincidence of the objects on the display screen.

BRIEF DESCRIPTION OF THE DRAWINGS

FIG. 1 is a block diagram embodying the present invention.

FIG. 2 is a more detailed block diagram of a portion of FIG. 1 illustrating one embodiment of the invention.

DETAILED DESCRIPTION OF THE PREFERRED EMBODIMENTS

Referring to FIG. 1 a standard video game unit 10 is provided with manual player control inputs 11. This game unit may be similar to many commercially available road racing games including "LeMANS" which is a road racing game sold by the Assignee of the present invention and in which the driver-player has access to a steering wheel, accelerator and brake pedal and operation of these controls serves to alter the relative location of an automobile on a video screen. In a preferred embodiment as illustrated in FIG. 1 the output of the game unit is a video signal on line 15 which includes only the moving automobile object. The video signal could consist of a red colored car on a blank background. The exact color or intensity of the object are only of interest in order to enable the player to distinguish his object from the pre-recorded objects and background.

A video tape recorder 12 has pre-recorded a road background with traffic where all the pre-recorded cars are colored green for example (so that the player can distinguish his red car). This output appears on line 13. A unique feature sensor unit 14 senses these green cars from the video tape recorder 12 as they appear on video line 13 and, after processing outputs a digital signal on line 16 to AND-gate 17. The other coincidence input of the AND-gate is from the video output line 15 of the game unit. The time coincidence of pre-recorded and player controlled cars on the two video lines 13 and 15 respectively causes AND-gate 17 to produce an output on line 18 which is integrated by integrator 19 and if it is of sufficient duration, produce a collision or crash signal on line 21 which is fed back into the video game unit 10. Such unit in a manner well known in the art may cause a crash sound to occur and also a score change for the game. Video lines 13 and 15 are also connected to a video summer 22 which drives a color television display.

Although in this embodiment the manually actuated car is red, this is immaterial to the operation of the coincidence circuit. Since the manual object is on a blank background, the presence of any video signal will indicate the manual object is being displayed at a certain location. Moreover, in a first person situation where no car is actually displayed (i.e., it appears to the player that he is physically in his car) the effective manual object could be an unseen spot representing the unseen body of the driver's car.

Unique feature sensor 14 is shown in one embodiment of the invention in greater detail in FIG. 2 and includes a color demodulator 23 for sensing the green cars represented by the video signal on line 13. Such color demodulator is of the standard type used in TV receivers as for example the integrated circuit. Model LM746 available from National Semiconductor Corporation. It has red, blue and green outputs all of which are processed by a threshold circuit 24. This is necessary since a color signal may consist of varying amounts of red, blue and green and thus if a green car were produced on a white background it would be necessary to distinguish from the green color component of the white background. In any case, the circuit of FIG. 2 also includes invertors 26 and 27 connected to the red and blue threshold circuits to provide an absolute indication at the output 16 of an AND-gate 28 of a green only car signal on video signal line 13. The inverted red and blue signals are combined with the non-inverted green signal at the AND-gate 28 to produce a green only signal on line 16. This signal is integrated by integrator 19 (FIG. 1) to finally produce a crash signal when two greens cars, one on a pre-recorded tape and the other produced by the video game unit, collide. The time response of integrator 19 may be adjusted to prevent noise from triggering a false crash.

In addition to a road racing game, the same type of color background could be used in a shooting safari where the jungle and lions are of a different color and the moving video game unit object is a shell burst. The coincidence of a lion and shell might cause a score.

Yet another embodiment of the invention would use only black and white video and thus the color demodulator 23 could be dispensed with. Here the road picture would have the road edges and other obstacles outlined in video black (that is the absence of a video signal). When a manually actuated car from the video game unit 10 coincided in time with the road edge or other obstacle produced by the video signal on line 13 a collision would be recorded. In this embodiment the unique feature sensor 14 is thus merely a threshold circuit. Such embodiment might be used as a driving test for students.

Furthermore as has previously been discussed in a first person game a manually actuated object need not even be displayed; only an effective object producing a detectable video signal is necessary.

In some cases the coupling of the video line 15 with AND-gate 17 may include a threshhold device where the video signal is more complex than merely a single car.

Thus a video game has been provided where a prerecorded video signal generator or tape is effectively utilized.

What is claimed is:

1. An interactive video system for detecting collisions between an object generated by the video system and a player object responsive to manual control, the video system comprising:
    a first video signal generator for providing a first video signal representing an object generated by the video system;
    manual control means for providing control signals in response to manual manipulation;
    a second video signal generator coupled to the manual control means for providing a second video signal representing a player object responsive to control signals;
    logic means coupled to the first and second video signal generators for providing a collision signal in response to coincidence of said first and second video signals; and
    detector means coupled to the logic means for providing an output signal in response to the duration of the collision signal exceeding a minimum time period.

2. An interactive video system as in claim 1 wherein said detector circuit is an integrator and the output signal is proportional to the duration of the collision signal.

3. An interactive video system as in claim 1 or 6 wherein the first signal generator provides a first video signal representing a moving object.

4. An interactive video system as in claim 3 further comprising means for combining the first and second video signals into a composite video signal.

5. An interactive video system for detecting collisions between selected objects generated by the video system and a player object responsive to manual control, the system comprising;
    a first video signal generator for providing a first video signal representing a first object and a second object, a portion of the first video signal associated with the first object being characterized by a unique feature;
    a detector circuit coupled to the first signal generator for providing a detect signal in response to the unique feature and for not providing a detect signal otherwise;
    manual control means for providing control signals in response to manual manipulation;
    a second video signal generator coupled to the manual control means for providing a second video signal representing a player object responsive to control signals;
    logic means coupled to the detector circuit and the second video signal generator for providing a collision signal in response to the coincidence of the detect signal and the second video signal; and
    an integrator coupled to the logic means for providing an output signal having an amplitude proportional to the duration of the collision signal.

6. An interactive video system as in claim 5 wherein the first object is a moving object.

7. An interactive video system as in claim 6 wherein the second object is a fixed object.

8. An interactive video signal as in claim 5 further comprising means for combining the first and second video signals into a complete video signal.

* * * * *